United States Patent Office 2,708,681
Patented May 17, 1955

2,708,681

PROCESS OF PRODUCING HIGHLY CONCENTRATED GAMMA ISOMER OF BENZENE HEXACHLORIDE

Jean Vossen, Brussels, Belgium, assignor to Solvay & Cie, Brussels, Belgium, a Belgian company No Drawing. Application September 6, 1950, Serial No. 183,460

Claims priority, application Belgium September 14, 1949

4 Claims. (Cl. 260—648)

This invention relates to a process of extraction of $\gamma$ isomer of benzene hexachloride from technical products, either crude or enriched in $\gamma$ isomer, obtained by chlorination of benzene.

It is known that by additive chlorination of benzene technical benzene hexachloride is obtained the composition of which is substantially the following:

$\alpha+\beta$ isomers_____750 gr. per kgr.
$\gamma$ isomer_____150 gr. per kgr.
$\delta_c$ isomer_____100 gr. per kgr.

The content of so-called "conventional $\delta$ isomer," represented by the symbol $\delta_c$, comprises the sum of the isomers of benzene hexachloride other than $\alpha$, $\beta$ and $\gamma$, as well as the impurities accompanying those isomers, the majority of those impurities being constituted by chloro-substituted compounds of benzene hexachloride.

All the compounds comprised in the expression $\delta_c$ are very soluble in the majority of usual solvents, and the methods of analysis of benzene hexachloride based on the differential solubilities of isomers do not permit their separation with precision.

Numerous processes are already known which enable the technical mixtures obtained by chlorination of benzene to be enriched in $\gamma$ isomer.

In general, these processes are based on a selective extraction by means of a suitable solvent. As no solvent is known in which only the $\gamma$ isomer would be soluble or insoluble, the product separated is always accompanied by not negligible amounts of other isomers. The products obtained by these known processes generally contain 40 to 60% of $\gamma$ isomer, and this content may be improved by utilising the action of various selective solvents.

In the co-pending application Ser. No. 13,945, filed March 9, 1948, now abandoned, there is described a process enabling pure $\gamma$ isomer to be obtained, by direct means, which process is based on the fact that by allowing a solution supersaturated with $\alpha$, $\beta$ and $\gamma$ isomers to cool slowly, without excessive agitation, only the $\gamma$ isomer crystallises, while the other isomers are maintained in supersaturation.

Nevertheless the difficulty is encountered of extracting by this means more than 50% of the amount of $\gamma$ benzene hexachloride in supersaturation in the starting solution. Before said solution is reduced to saturation with $\gamma$, the crystals of the other isomers appear, and the continuation of the operation with a view to increasing the extraction output would have the effect of contaminating the product with the other isomers.

The present invention supplies a process enabling the $\alpha$, $\beta$ and $\gamma$ isomers to be maintained at will in supersaturation whatever the solvent used. Starting from a solution supersaturated with $\alpha$, $\beta$ and $\gamma$, it enables this solution to be brought to saturation with $\gamma$ by selective precipitation of that isomer, the other isomers being maintained in supersaturation for a sufficient time for them only to appear when the solution has been brought to saturation with the $\gamma$ isomer.

It is based on the observation that the maintenance of the isomers in supersaturation is influenced by the presence of relatively large amounts of $\delta_c$ in the solution to be crystallised, and that this property is the more marked, the higher the $\delta_c$ content of the solution. It has been observed in fact that when starting with a solution supersaturated with pure $\alpha$, $\beta$ and $\gamma$ isomers, the slow cooling of this solution led to the simultaneous crystallisation of all the isomers in supersaturation. On the other hand, the presence of $\delta_c$ causes the maintenance in supersaturation of all the isomers, the chronological order of precipitation being such that the $\gamma$ isomer always crystallises first.

The amounts of $\delta_c$ usually contained by benzene hexachlorides are rather small. Crude technical benzene hexachloride contains about 10% thereof, as has been indicated hereinabove. By enriching the product by the extraction of the $\gamma$ isomer, the concentration of $\delta_c$ is increased, but this increase is variable with the nature of the solvent used. Supersaturated solutions prepared by dissolving such products have $\delta_c$ concentrations too low to give results utilisable in practice.

The object of the present invention is to create deliberately, under controllable conditions, the lack of equilibrium which leads to the separation of the $\gamma$ isomer, so that the process can be carried out on an industrial scale with a certain yield.

According to the invention, technically pure $\gamma$ isomer is obtained by selective crystallisation of that isomer from a solution supersaturated with $\alpha$, $\beta$ and $\gamma$ isomers at the temperature of crystallisation, by adding to the solution to be maintained selectively in supersaturation amounts of $\delta_c$ such that the concentration in those compounds is comprised between 20 and 50% by weight.

The content of $\delta_c$ of the supersaturated solution subjected to selective crystallisation depends on the amount of the isomers other than $\gamma$ to be maintained in supersaturation. This concentration will be the higher, the higher the supersaturation in $\alpha$ and $\beta$, and if any in $\delta$ isomers.

The supersaturated solutions in question here may be obtained by various means. Generally it is preferred to start from a saturated or practically saturated solution resulting from a preceding operation. In this case it is sufficient to dissolve therein, in the hot state, new amounts of benzene hexachloride enriched with $\gamma$ isomer, so as to obtain the desired supersaturation.

It is obviously possible to dissolve therein crude benzene hexachloride containing 15% of $\gamma$, but in that case the amount of $\gamma$ isomer in supersaturation is low compared with that of $\alpha+\beta$ isomers, so that in order to precipitate a given weight of pure $\gamma$ isomer it is necessary to handle large volumes of solution. For this reason, it is advantageous to supersaturate the solution by dissolving benzene hexachloride enriched with $\gamma$ isomer by a known process, for example that described in the above mentioned patent application Serial No. 13,945.

The amounts of $\delta_c$ which must be added to the initial solution in order to bring the concentration to a value comprised between 20 and 50% by weight are easily obtained by selective dissolution of those compounds in a suitable solvent, which may advantageously be the solvent in which the crystallisation will be carried out.

In the industrial applications of the process of the invention, it is of interest to maintain constant the conditions of crystallisation, in order to be able to determine with certainty the moment when all the $\gamma$ isomer is precipitated. This result can only be obtained by likewise maintaining constant the content of $\delta_c$ in the supersaturated solution.

In cyclic processes, the recycled solution is enriched in $\delta_c$ by the addition of these compounds contained in the benzene hexachloride treated. In this case, it is advisable to remove from each cycle an amount of $\delta_c$ equivalent to that introduced by dissolving technical benzene hexachloride in the solution. For this purpose, a fraction of the recycled solution is evaporated so as to precipitate the desired amounts of $\delta_c$, then the solution is adjusted by reintroducing thereinto the solvent evaporated, and if desired a new amount of fresh solvent.

The evaporation however is not always necessary. In fact, the precipitated crystals remain impregnated with mother liquors; the result is that a part of the solvent and of the $\delta_c$ dissolved therein disappears during washing. In this case, it is possible to maintain the concentration of $\delta_c$ constant by the introduction of new amounts of fresh solvent.

As has already been stated above, the high concentrations of $\delta_c$ not only have the effect of maintaining the $\alpha$, $\beta$ and possibly the $\delta$ isomers in supersaturation, they also maintain the $\gamma$ isomer for a shorter time.

With the object of accelerating the precipitation of the latter isomer, the crystallisation may be initiated by inoculation, as has already been indicated in the above mentioned patent application.

Similarly, when all the $\gamma$ isomer in supersaturation is precipitated, the crystallisation of the other isomers remaining in supersaturation may be hastened by any known means, for example by abruptly cooling the solution and then bringing it back to the temperature at which it is desired to obtain the solution saturated with all the isomers.

In order to enable the process of the invention to be better understood, we give hereinbelow some examples of realisation. The invention is not however limited to the solvents or concentrations considered in these examples.

Example I

Selective precipitation of the $\gamma$ isomer in supersaturation in a solution in isopropyl alcohol.

1 kg. of benzene hexachloride previously enriched with $\gamma$ isomer, and having a composition of 19% of $\alpha+\beta$, 48% of $\gamma$, and 33% of $\delta_c$, is dissolved at 65° C. in 825 gr. of isopropyl alcohol. A solution supersaturated with $\alpha$, $\beta$, $\gamma$ isomers at 20° C. is obtained, containing 18.1% of $\delta_c$. This concentration is too low to enable pure $\gamma$ isomer to be obtained by cooling to 20° C. Only a product containing 74% of $\gamma$ isomer is obtained. The mother solution has been enriched with $\delta_c$ by the addition of the compounds contained in the starting benzene hexachloride, and the concentration brought to 26.5%.

By repeating these successive operations of dissolution and crystallisation, an improvement of the $\gamma$ content of the product separated is found in proportion as the concentration of $\delta_c$ of the solution subjected to crystallisation is increased.

After four successive crystallisations, there is obtained a solution saturated at 20° C., with $\alpha$, $\beta$, $\gamma$, and $\delta$ isomers, and containing 10.8% of $\alpha+\beta$, 10.5% of $\gamma$, 42.3% of $\delta_c$, and 36.4% of isopropyl alcohol.

By dissolving in 1 kg. of this solution 200 gr. of enriched benzene hexachloride of the composition indicated hereinabove, there is obtained a solution supersaturated at 20° C., with $\alpha$, $\beta$, $\gamma$, $\delta$ isomers and containing 40.8% of $\delta_c$, and holding 96 gr. of $\gamma$ isomer in supersaturation at 20° C.

This solution is cooled to 20° C., and then kept at that temperature with agitation for 4 hours.

The crystals of $\gamma$ isomer are filtered and washed twice with 25 cc. of isopropyl alcohol. 89 gr. of 98–99% pure $\gamma$ isomer are obtained, i. e. a yield of 93% referred to the amount theoretically crystallisable.

The mother liquors are then kept in agitation for 48 hours so as to precipitate the other isomers in supersaturation.

From the mother liquors a fraction of 8% by weight is taken and evaporated to dryness so as to eliminate the amount of $\delta_c$ introduced with the 200 gr. of benzene hexachloride enriched with $\gamma$. The solvent is added to the mother liquors and the new solution is used for a further crystallisation.

Example II

Cyclic process of crystallisation of pure $\gamma$ isomer from a benzene solution.

A start is made from 1160 gr. of a solution supersaturated at 20° C., with $\alpha$, $\beta$, $\gamma$, $\delta$ isomers, containing $\alpha+\beta$: 95 gr. (8.2%); $\gamma$: 268 gr. (23.1%); $\delta_c$: 484 gr. (41.7%); benzene: 313 gr. (27.0%), obtained by dissolving at 40° C. 200 gr. of benzene hexachloride containing 48% of $\gamma$ isomer in 960 gr. of a solution coming from a preceding cycle.

This solution contains, in relation to the saturation at 20° C., 81 gr. of $\gamma$ isomer in supersaturation.

By cooling this solution to 20° C. during 3 hours with moderate agitation, 80 gr. of 98–99% $\gamma$ isomer are precipitated, i. e. a yield of 98% referred to the theoretical amount of $\gamma$ isomer precipitatable by desupersaturation at 20° C.

After separation of the $\gamma$ isomer, the mother solution is maintained under agitation for 48 hours at 20° C. so as to cause the crystallisation of the other isomers in supersaturation. 64 gr. of a product constituted by $\alpha+\beta+\delta$ isomers are collected, containing only traces of $\gamma$ isomer (<2%).

After filtration, there is separated from the solution saturated at 20° C. with $\alpha$, $\beta$, $\gamma$, $\delta$ isomers a fraction of about 8% which is evaporated to dryness so as to separate an amount of $\delta_c$ equivalent to that introduced during the preceding operations. The evaporated solvent is mixed with the remaining mother solution, and the solution thus obtained is returned to the cycle, where it is used for the preparation of a fresh supersaturated solution.

Example III

Cyclic process utilising an aqueous solution of ethylene chlorohydrin as solvent.

To 978 gr. of a solution containing 28 gr. (2.9%) of $\alpha+\beta$, 84 gr. (8.6%) of $\gamma$, 306 gr. (31.3%) of $\delta_c$, 560 gr. (57.2%) of 84% aqueous chlorohydrin, originating from a preceding cycle, there are added 113 gr. of benzene hexachloride containing 48% of $\gamma$ isomer, 19% of $(\alpha+\beta)$, 33% of $\delta_c$.

By heating to 45° C., there is thus obtained a solution characterised by a $\delta_c$ content of 31.4%.

By cooling this solution to 20° C., with agitation, 41 gr. of pure $\gamma$ isomer are obtained after 1½ hours.

The mother solution is abruptly cooled to 5° C. so as to bring about the start of the crystallisation of the other isomers in supersaturation, and then the solution is heated to 20° C. and kept under agitation for 6 hours. 41 gr. of crystals are precipitated containing 83% of $\alpha+\beta+\delta$ isomers and 17% of $\gamma$ isomer.

The mother solution is saturated at 20° C. with all the isomers. It contains 90 gr. of $\gamma$ isomer. The amount theoretically crystallisable was therefore 48 gr. The yield of $\gamma$ isomer precipitated is 85%.

From the solution saturated at 20° C. about 7% is taken, and from this fraction all the isomers and impurities are precipitated by adding water. To the remaining saturated solution fresh or recovered solvent is added so as to regenerate the starting solution, in which fresh amounts of benzene hexachloride containing 48% of $\gamma$ isomer are dissolved in order to start a new cycle.

Example IV

Cyclic process utilising trichloroethylene as solvent.

In 991 gr. of a solution coming from a preceding cycle and containing 24 gr. (2.4%) of $\alpha+\beta$, 104 gr. (10.5%) of $\gamma$, 346 gr. (34.9%) of $\delta_c$, 517 gr. (52.2%) of trichloroethylene, there are dissolved at 40° C. 300 gr. of benzene hexachloride containing 48% of $\gamma$ isomer, 19% of $(\alpha+\beta)$, and 33% of $\delta_c$. There is thus obtained a solution supersaturated at 20° C. containing 34.5% of $\delta_c$, and 137 gr. of $\gamma$ isomer precipitatable at 20° C.

By then keeping this solution at 20° C. under agitation for 1½ hours, 123 gr. of this isomer are precipitated in the technically pure state (98–99%), and are filtered. The mother solution is then kept at 20° C. for 48 hours so as to bring the solution to saturation at 20° C.

The 144 gr. of crystals precipitated contain 55 gr. (38.2%) of $\alpha+\beta$, 14 gr. (9.7%) of $\gamma$, and 75 gr. (52.1%) of $\delta_c$. The extraction yield is therefore 91.8%.

From the saturated solution a fraction representing about 6% of the total amount is separated. This fraction is evaporated to dryness so as to eliminate the $\delta_c$ introduced by the dissolved benzene hexachloride, and the trichloroethylene recovered is added to the remaining mother solution, so as to regenerate a solution containing 34.9% of $\delta_c$ to be used for the dissolution of a fresh amount of technical benzene hexachloride.

The benzene hexachloride containing 48% of $\gamma$ isomer utilised for carrying out the tests described in the above examples was obtained by selective extraction of the $\gamma$ isomer from the crude chlorination product by means of a limited amount of trichloroethylene so as to obtain a solution saturated at 20° C. The saturated solution was then evaporated to dryness.

Benzene hexachloride enriched with $\gamma$ isomer by any other process may also be used. In particular, use may be made of the product obtained by evaporation of the benzene solution saturated with $\gamma$ prepared according to the co-pending patent application Ser. No. 692,722, filed August 23, 1946, now Patent No. 2,529,803, November 14, 1950.

Furthermore, as stated above, the starting material may be constituted by crude benzene hexachloride containing 12 to 15% of $\gamma$ isomer.

In this case, the enriching process may advantageously be combined with the process of separation of pure $\gamma$ isomer as described in the example below.

Example V

To 1065 gr. of a solution supersaturated at 20° C. with $\alpha$, $\beta$, and $\delta$ isomers, originating from a preceding cycle, and containing 55 gr. (5.2%) of $\alpha+\beta$, 110 gr. (10.3%) of $\gamma$, 408 gr. (38.3%) of $\delta_c$, 492 gr. (46.2%) of trichloroethylene, there are added 1000 gr. of crude benzene hexachloride of the following composition: $\alpha+\beta$ 77%, $\gamma$ 14%, $\delta_c$ 9%, together with 660 gr. of trichloroethylene, the amount required to dissolve, to saturation at 20° C., all the $\gamma$ isomer contained in the crude benzene hexachloride introduced.

After agitation for 8 hours at room temperature, the undissolved isomers are filtered.

A mixture of crystals containing 89% of $\alpha+\beta$ isomers and a solution saturated at 20° C. with $\alpha$, $\beta$, $\gamma$, $\delta$ isomers are obtained.

From this solution, the amount of trichloroethylene introduced for the dissolution is evaporated, so as to obtain finally 1236 gr. of a solution supersaturated at 20° C. containing 245 gr. of $\gamma$ (19.8%), and 440 gr. of $\delta_c$ (35.6%). This solution, when kept at 20° C. under agitation for 1½ hours, gives up 126 gr. of pure (98–99%) $\gamma$ isomer crystals. The amount of $\gamma$ isomer in supersaturation being 140 gr., the extraction yield is therefore 89%. After separation of the pure $\gamma$ isomer, about 7% of the solution still supersaturated in $\alpha$, $\beta$, and $\delta$ is taken, and this fraction is evaporated to dryness in order to remove from the cycle the amount of $\delta_c$ introduced with the crude benzene hexachloride. The evaporated trichloroethylene is recovered and added to the remaining supersaturated solution, and the solution thus obtained is recycled for a fresh dissolution of crude chlorination benzene hexachloride.

I claim:

1. A process of producing highly concentrated gamma isomer of benzene hexachloride by crystallization at a predetermined crystallization temperature which comprises preparing a solution of benzene hexachloride in a solvent for benzene hexachloride supersaturated in alpha, beta and gamma isomers at the crystallization temperature and containing less than 25% by weight of $\delta_c$, heating said solution to a temperature above said crystallization temperature, adding to said solution additional amounts of $\delta_c$ to increase the concentration of $\delta_c$ in said solution and to establish said concentration at a value of about 25% to 50% by weight, cooling said solution to said crystallization temperature, thereby causing the gamma isomer to crystallize from the solution, and separating the crystals of gamma isomer thus obtained from the solution still containing the other isomers in supersaturation, the symbol $\delta_c$ being used herein to designate the sum of isomers other then alpha, beta and gamma and the chloro-substituted compounds of benzene hexachloride obtained as by-products of the addition chlorination of benzene.

2. A process of producing highly concentrated gamma isomer of hexachloride by crystallization at a predetermined crystallization temperature which comprises heating a technical benzene hexachloride solution supersaturated in alpha, beta and gamma isomers at the crystallization temperature and containing less than 25% by weight of $\delta_c$ to a temperature above said crystallization temperature, adding to said solution additional amounts of $\delta_c$ to increase the concentration of $\delta_c$ in said solution and to establish said concentration at a value of about 25% to 50% by weight, cooling said solution to said crystallization temperature, with moderate agitation, for a period sufficient to effect crystallization of the gamma isomer from the solution, separating the crystals of gamma isomer thus obtained from the solution, precipitating the other isomers from said solution, filtering said solution, dissolving in said filtered solution a fresh amount of technical benzene hexachloride while reestablishing a concentration of $\delta_c$ in the mother liquor of 25–50% by weight and repeating the steps of cooling to effect crystallization, separating the crystals of gamma isomer, precipitating the other isomers and filtering the solution, the symbol $\delta_c$ being used herein to designate the sum of isomers other than alpha, beta and gamma and the chloro-substituted compounds of benzene hexachloride obtained as by-products of the addition chlorination of benzene.

3. A process of producing highly concentrated gamma isomer of benzene hexachloride by crystallization at a predetermined crystallization temperature which comprises preparing a solution of benzene hexachloride in a solvent for benzene hexachloride supersaturated in alpha, beta and gamma isomers at the crystallization temperature and containing less than 25% by weight of $\delta_c$, heating said solution to a temperature above said crystallization temperature, adding to said solution additional amounts of $\delta_c$ to increase the concentration of $\delta_c$ in said solution and to establish said concentration at a value of about 25% to 50% by weight, cooling said solution to said crystallization temperature, thereby causing the gamma isomer to crystallize from the solution, and separating the crystals of gamma isomer thus obtained from the solution still containing the other isomers in supersaturation, the symbol $\delta_c$ being used herein to designate the sum of isomers other than alpha, beta and gamma and the chloro-substituted compounds of benzene hexachloride obtained as by-products of the addition chlorination of benzene, adding to the solution supersaturated in alpha and beta isomers and $\delta_c$ obtained after crystallization of the gamma isomer, technical benzene hexachloride and a limited amount of said solvent sufficient to dissolve at said crystallization temperature all the gamma isomer contained in the benzene hexachloride added, maintaining the resulting solution at said crystallization temperature for a time sufficient to ensure the dissolution of all the gamma isomer contained in the benzene hexachloride added, filtering the saturated solution, heating said solution and evaporating therefrom said previously added amount of solvent, cooling said solution to said crystallization temperature, thereby precipitating gamma isomer, separating the crystals of gamma isomer from the mother solution, reestablishing a concentration of $\delta_c$ in the mother solution of 25 to 50% by weight, and recycling the mother solution for reception of a fresh quantity of technical benzene hexachloride.

4. A process of producing highly concentrated gamma isomer of benzene hexachloride as defined in claim 1, wherein said crystallization temperature is room temperature and said solvent is selected from the group consisting of isopropy alcohol, benzene, ethylene chlorohydrin and trichloroethylene.

References Cited in the file of this patent

FOREIGN PATENTS 471,941   Belgium _____ April 1947